US008816548B2

(12) United States Patent
Tomizawa et al.

(10) Patent No.: US 8,816,548 B2
(45) Date of Patent: Aug. 26, 2014

(54) DRIVE UNIT WITH CONTROLLER CASE INCLUDING LEVER (75) Inventors: Hiroki Tomizawa, Kariya (JP); Hiroshi Imai, Toyohashi (JP)

(73) Assignee: Denso Corporation, Kariya (JP)

( * ) Notice: Subject to any disclaimer, the term of this patent is extended or adjusted under 35 U.S.C. 154(b) by 350 days.

(21) Appl. No.: 13/469,126

(22) Filed: May 11, 2012

(65) Prior Publication Data

US 2012/0286630 A1 Nov. 15, 2012

(30) Foreign Application Priority Data

May 11, 2011 (JP) ................................. 2011-106361

(51) Int. Cl.
*H02K 11/00* (2006.01)
*H02K 5/22* (2006.01)
(52) U.S. Cl.
CPC ............ *H02K 5/225* (2013.01); *H02K 11/0073* (2013.01)
USPC ............. 310/68 D; 310/67 R; 310/71; 310/89
(58) Field of Classification Search
CPC ..... H02K 5/22; H02K 5/225; H02K 11/0068; H02K 11/0073; H05K 7/1409
USPC ........................................ 310/67 R, 68 D, 71
See application file for complete search history.

(56) References Cited

U.S. PATENT DOCUMENTS

| 4,954,928 A | * | 9/1990 | Jullien ..................... 361/679.31 |
| 5,030,128 A | * | 7/1991 | Herron et al. ................. 439/372 |
| 5,241,875 A | * | 9/1993 | Kochanneck ............... 74/490.03 |
| 5,513,079 A | * | 4/1996 | Millard ......................... 361/823 |
| 2003/0127921 A1 | | 7/2003 | Akutsu et al. |
| 2011/0043082 A1* | | 2/2011 | Billmann et al. ........... 310/68 R |
| 2012/0056572 A1* | | 3/2012 | Bigler et al. .................. 318/570 |

FOREIGN PATENT DOCUMENTS

| JP | 10248199 A | * | 9/1998 | ............. H02K 5/22 |
| JP | 2000217310 A | * | 8/2000 | ............. H02K 11/00 |
| JP | 2006187149 A | * | 7/2006 | |

\* cited by examiner

*Primary Examiner* — Burton Mullins
*Assistant Examiner* — Eric Johnson
(74) *Attorney, Agent, or Firm* — Nixon & Vanderhye PC (57) ABSTRACT A drive unit includes a motor disposed in a motor case, a controller, disposed in a controller case, and a lever. The lever includes a supported portion that is fitted on a support of the controller case in a rotatable manner, a first action point at a first distance from the supported portion, and a second action point at a second distance from the supported portion. When the lever rotates from a close state toward an open state according to an application of a first force to the first action point, the second action point abuts on a specific part on the motor case, thereby generating a second force from the second action point to the specific part in a parallel direction of the axis of the motor case, with its reaction force reversely applied from the supported portion to the support as a third force.

6 Claims, 9 Drawing Sheets

DRIVE UNIT WITH CONTROLLER CASE INCLUDING LEVER

CROSSREFERENCE TO RELATED APPLICATION

This application is based on and claims the benefit of priority of Japanese Patent Applications No. 2011-106361 filed on May 11, 2011, the disclosure of which is incorporated herein by reference.

TECHNICAL FIELD

The present disclosure generally relates to a drive unit, which has a control unit to control a rotation of a motor and the motor itself in one body.

BACKGROUND

Conventionally, an electric power steering device is known for using a drive unit in which a motor and its control unit are disposed in one body. The drive unit of the electric power steering device disclosed in Japanese Patent Laid-Open No. 2003-204654 ('654), has a terminal on the control unit side that is affixed to a heat sink by a resin mold, and affixed to a terminal on the motor side by way a screw in a screw-fitted manner. In such connection structure of the terminals, it is necessary to remove the screws one by one when the motor and the control unit are separated. Therefore, when the control unit is broken and the control unit has to be removed from the motor for replacement, for example, all the screws have to be unscrewed and removed, thereby making such replacement procedure very time-consuming. In addition, a replaced control unit has to be attached to the motor by screwing all those screws again, which is also very time-consuming.

Therefore, for example, by shaping one of the motor side terminal and the control unit side terminal in a "male" shape and the other terminal in a "female" shape, the terminals of the motor and the control unit may attach and detach without the use of screws. However, in such insert-fit structure for connecting terminals, an appropriate force for inserting/pulling out the terminal needs to be applied when the terminals on the control unit side are inserted into or pulled out from the terminals on the motor side. Further, in a course of manually applying such "insert-pullout" force in the insert-fit structure, the control unit may be tilted thereby inadvertently generating an un-desired force on the terminals in an un-expected direction other than an insertion/pullout direction of those terminals (i.e., an insertion/pullout direction is simplified as an "insertion direction" hereinafter). Application of such un-desired force in the un-expected direction may, therefore, lead to a situation in which smooth insertion and/or pull-out of those terminals is disabled, or, in other words, those terminals may be broken by such force.

Further, when the drive unit has a high output motor by receiving a large electric current, the terminal on the control unit side may be desirably connected to the terminal on the motor side very tightly. Such a tight connection between the control unit and the motor may make it more difficult to manually connect and/or remove the control unit to/from the motor, because the above-mentioned insert-pullout force may be increased when the connection is tight.

SUMMARY

In an aspect of the present disclosure, the drive unit includes a motor, a controller, and lever. The motor includes a stator that has a winding wire wound disposed thereon and a first terminal electrically coupled to an end of the winding wire. In addition the motor includes a rotor disposed inside of the stator, a shaft disposed inside of and coupled to the rotor, such that the rotor and the shaft rotate relative to the stator as one. In addition the motor may be housed in a motor case that may have a cylindrical shape The controller includes a switching element for switching supply of an electric current to the winding wire of the motor and a control unit (60) to control the rotation of the motor via the switching element. The control also includes a second terminal that electrically couples to the switching element at one end and electrically couples to the first terminal at the other end.

The controller may be housed in a controller case. The controller case may have a support that projects outward from an outer-surface of the controller case in direction perpendicular to an axis of the controller case. The controller case is attachable to the motor case on one end of the motor case, where the axis of the controller case is substantially aligned in parallel with the axis of the motor case.

The lever includes a supported portion coupled to the support of the controller case, a first action point positioned at a first distance from the supported portion, and a second action point positioned at a second distance from the supported portion. The supported portion is rotatable about the support and the lever is rotatable about the supported portion.

In the present disclosure, the lever is in a close state when its first action point is closest to the controller case in a rotatable range, and the lever is in an open state when the first action point is farthest from the controller case. Further, when the lever is rotated from the close state to the open state by an application of a first force to the first action point, the second action point is abutted to a specific part of the motor case, and the second action point applies, to the specific part, a second force in a direction that is in parallel with the axis of the motor case. Further, when the lever is rotated in such manner, an opposite (i.e., a reactive) force that is opposite to the direction of the second force along the axis of the motor case is applied from the supported portion of the lever to the support of the controller case. Such force is designated as a third force, which is a reaction force of the second force.

In such structure, when the first action point of the lever is manually rotated by the first force having a certain magnitude, a separating force for separating the motor case and the controller case is applied to respective cases as the second force and as the third force, and both of those forces are aligned in a direction that is in parallel with the axis of the motor. Therefore, the controller case and the motor case are easily moved in separate (i.e., opposite) directions along the axis of the motor case. In a course of such separation, an engagement portion that engages the first terminal and the second terminal receives a force that is in parallel with the axis of the motor case. If the insertion direction of the engagement portion of the first terminal into the second terminal (i.e., the insertion direction may also be a release direction for releasing the engagement) is aligned substantially in parallel with the direction of the axis of the motor case, the engagement between the first terminal and the second terminal is smoothly released when the controller case and the motor case are separated by using the lever in the above described manner. Thus, the controller case and the motor case are smoothly separated by rotating the lever.

BRIEF DESCRIPTION OF THE DRAWINGS

Other objects, features and advantages of the present invention will become more apparent from the following detailed description made with reference to the accompanying drawings, in which.

DETAILED DESCRIPTION

A drive unit of the present disclosure will be described with reference to the drawings.

Figure 1:
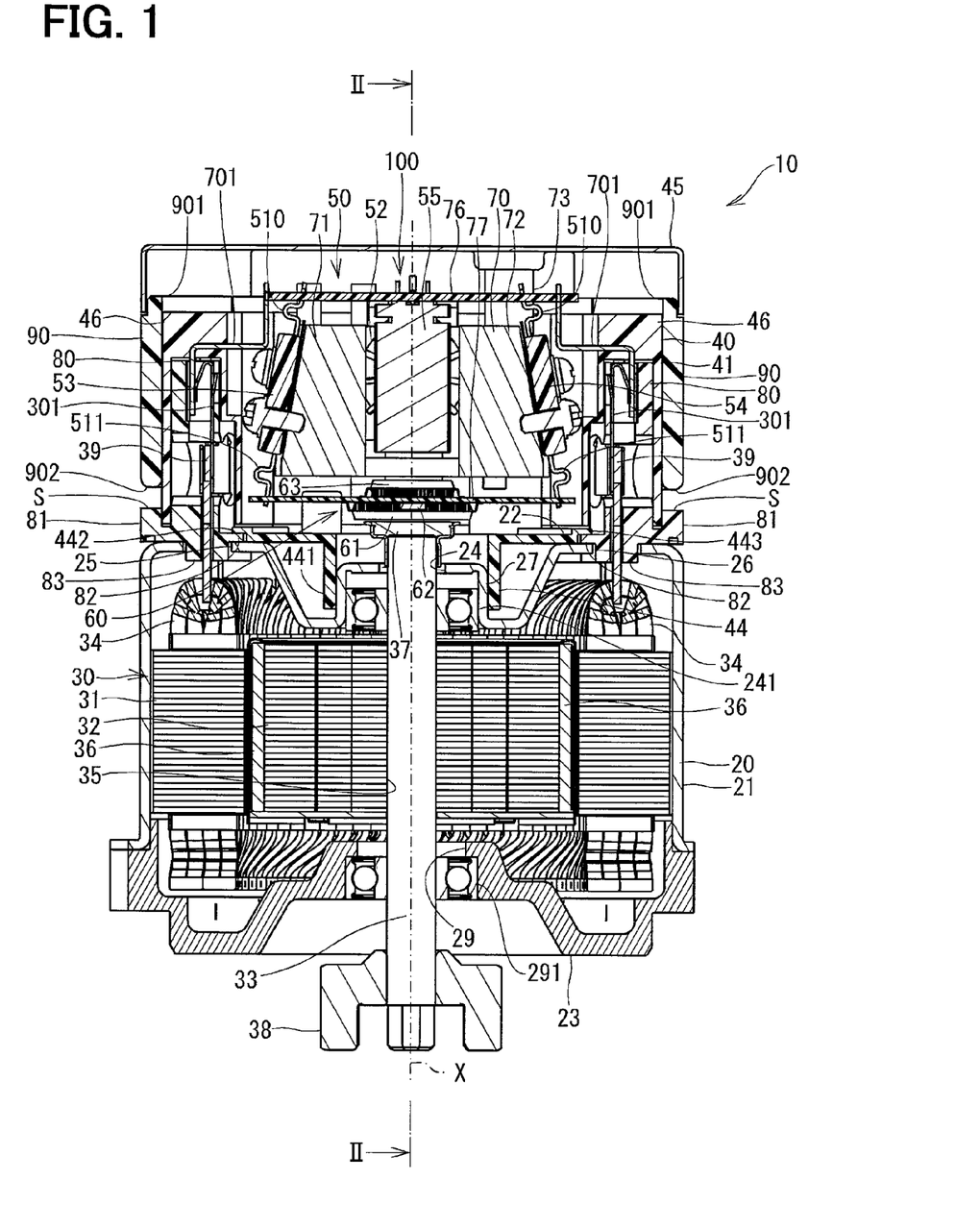
FIG. 1 a cross-sectional view of a drive unit of the present disclosure.
Figure 2:
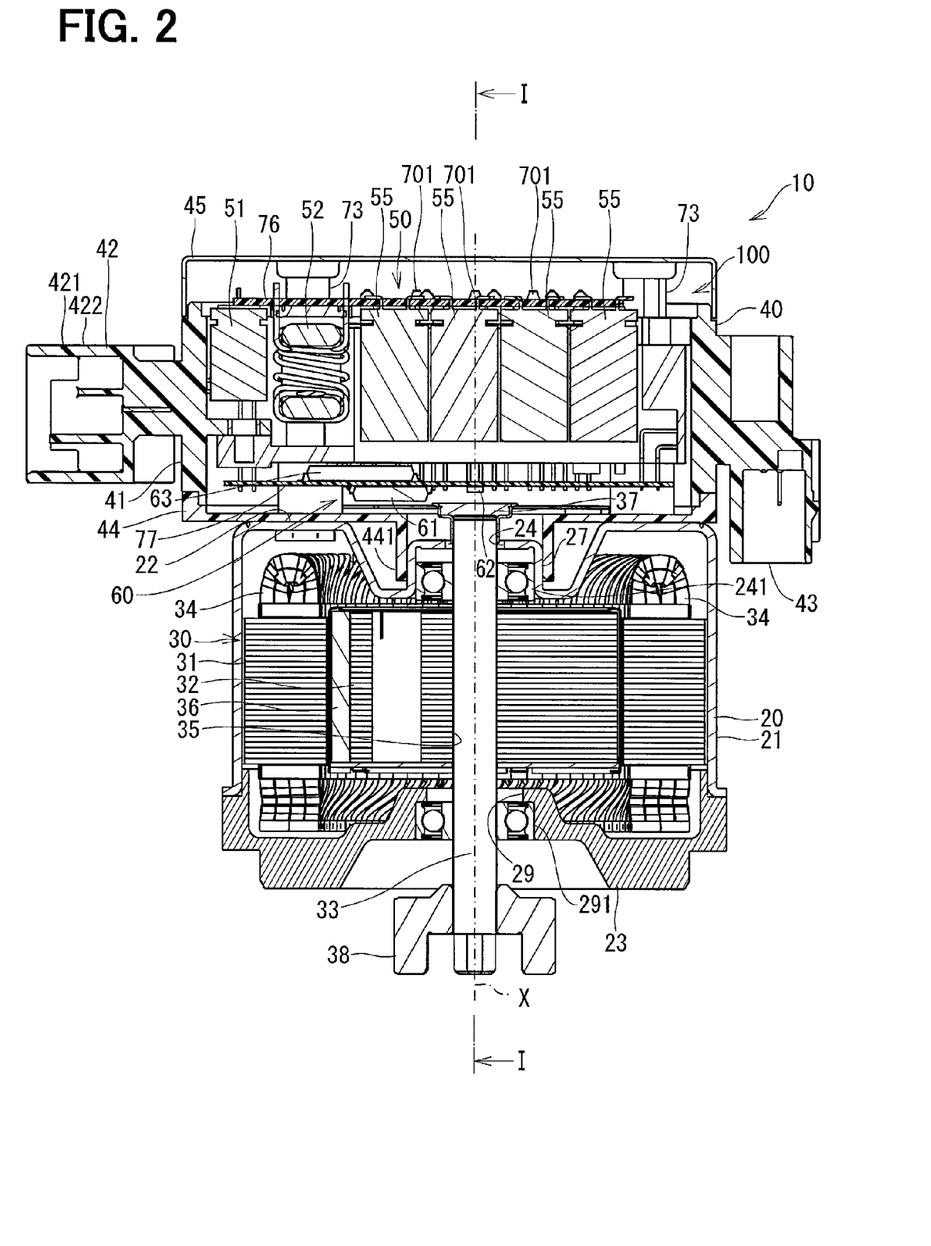
FIG. 2 is a cross-sectional view of the drive unit along a line II-II of FIG. 1.
Figure 3:
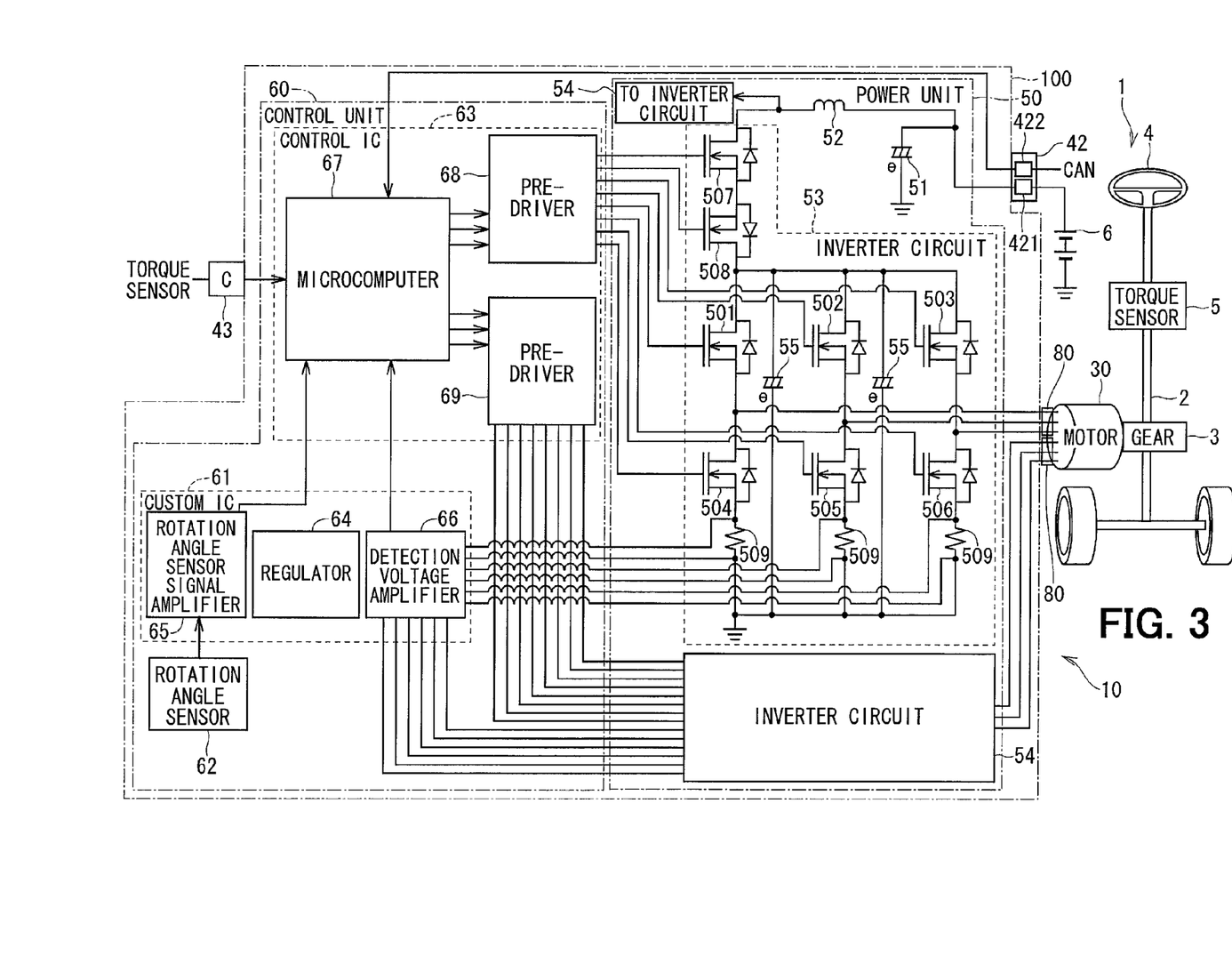
FIG. 3 is a circuit diagram of the drive unit of the present disclosure.

A drive unit 10 of the present disclosure is illustrated in FIGS. 1 to 5. With reference to FIG. 3, the drive unit 10 provides the power assist of an electric power steering device 1 disposed in a vehicle. The drive unit 10 is disposed so that a motor 30 engages with a gear 3 of a gear box that is disposed on a column 2 by way of a shaft 33 (FIG. 1) disposed in the motor 33. The drive unit 10 generates an assist force for a steering operation by rotating the motor 30 based on various signals received from a controller area network (CAN), such as a vehicle speed signal or the like, as well as a torque signal from a torque sensor 5 that detects steering torque of a steering wheel 4.

With reference to FIGS. 1 and 2, where FIG. 1 is provided as a cross-section of the drive unit 10 along lines I-I of FIG. 2, the drive unit 10 includes a motor case 20, the motor 30, a controller case 40, and a controller 100. The motor case 20 has a cylinder part 21 and a bottom part 22, and may be formed of metal. The cylinder part 21 is formed substantially in a cylinder shape. The bottom part 22 is formed at one end of the cylinder part 21 to close an opening of the cylinder part 21. The bottom part 22 defines a shaft hole 24 around a center axis X of the drive unit 10 (i.e the shaft hole 24 is defined through the bottom part 22 in a thickness direction of the bottom part 22 around the center axis X). The bottom part 22 further defines a first opening 25 and first opening 26 on either side of the shaft hole 24, such that the shaft hole 24 is substantially in the middle of the first opening 25 and first opening 26. The first opening 25 and the first opening 26 may be referred to as the first opening 25, 26. The motor case 20 has two terminal holders 80. Both of the terminal holders 80 are disposed on the bottom part 22, and respectively close the first opening 25 and the first opening 26. The terminal holder 80 will be described later in detail.

The cylinder part 21 also includes a frame end 23 that is disposed on the opposite end of the cylinder part 21 relative to the bottom part 22. The frame end 23 is arranged to close an opening of the cylinder part 21. Similar to the bottom part 22, the frame end 23 defines a shaft hole 29 around the center axis X of the drive unit (i.e., the shaft hole 29 is defined through the frame end 23 in a thickness direction of the frame end 23), such that the center of the shaft hole 29 is aligned with the center of the shaft hole 24.

The motor 30 includes a stator 31, a rotor 32, a shaft 33, and a first terminal 301. The motor 30 may be provided as a three phase electric motor. The stator 31 is formed substantially in the shape of a circular ring by stacking sheets of magnetic material. The stator 31 is housed inside of the cylinder part 21 of the motor case 20, with its outer wall fixed to an inner wall of the cylinder part 21. The stator 31 and the cylinder part 21 are disposed coaxially about the center axis X of drive unit 10. The stator 31 has a plurality of winding wires 34 wound thereon. Each wire end 29 of the winding wires 34 goes through the first opening 25 or the first opening 26 to the other side of the bottom part 22 of the motor case 20. In the present embodiment, each of the first opening 25, 26 has three wire ends 39 going therethrough. Further, the three wire ends 39 in each of the first openings 25, 26 respectively correspond to three phases (i.e., a U phase, a V phase, a W phase) of the winding wires 34.

The rotor 32 is formed substantially in the shape of a circular column by stacking sheets of magnetic material. The rotor 32 is disposed inside of and coaxially with the stator 31, such that the rotor 32 rotates relative to the stator 31. The rotor 32 has an axis hole 35 formed thereon to receive and house the shaft 33. The rotor 32 also includes a plurality of magnets 36 disposed equidistantly on an outer wall of the rotor, in an alternating manner (i.e. by alternating an N pole and an S pole of the magnets).

The shaft 33 is formed substantially in the shape of a rod and maybe made of metal. The shaft 33 is supported by a bearing 241 disposed on the bottom part 22 side of the motor case 20 and by a bearing 291 disposed on the frame end 23 side of the motor case 20. The bearing 241 is disposed in a pipe part 27, which is formed by the bottom part 22 around the shaft hole 24, such that the bearing 241 is positioned within the motor case 20 and is centered along the same axis as the shaft hole 24. The bearing 291 is disposed in the shaft hole 29 on the frame end 23, such that the bearing 291 is positioned on an outer surface of the frame end 23 and is centered along the same axis as the shaft hole 29. The shaft 33 is also fixed in the axis hole 35 of the rotor 32. Therefore, the shaft 33 together with the rotor 32 rotates relative to the stator 31 as one, where the rotational axis of the shaft 33 and the rotor 32 is about the center axis X.

A magnet 37 is installed on an end of the shaft 33 that is on the bottom part 22 side of the shaft 33. The output end 38 is formed on the other end of the shaft 33 that is on the frame end 23 side of the shaft 33. The output end 38 engages the drive unit 10 with the gear 3 of the electric power steering device 1.

The first terminal 301 is, for example, formed substantially in the shape of a long board by metal, such as copper. The first terminal 301 is disposed so that one end is electrically coupled to each end 39 of the winding wires 34 via the first opening 25, 26 of the bottom part 22 of the motor case 20. In other words, the first terminals 301 are arranged at six positions, which are divided into two groups, that is, three ends 39 on the first opening 25 side and the other three ends 39 on the first opening 26 side. Further, each end 39 of the winding wires 34 and the first terminal 301 are electrically coupled, for example, by welding. Further, the other end of the first terminal 301 is formed in a female shape.

The controller case 40 has a main body 41, a first connector 42, a second connector 43, a lid 44, and a cover 45. The main body 41 is formed substantially in the shape of a cylinder, and may be made of resin. The first connector 42 and the second connector 43 are arranged to protrude in a radially-outward direction from the main body 41. The first connector 42 has a power connector 421 to receive power from a power supply and a signal connector 422 to receive signals. The lid 44 may be made of resin, and is disposed to close one end of the main body 41 (i.e. an end of the main body 41 closet to the motor case 20). The cover 45 may be made of metal, and is disposed to close the other end of the main body 41 (i.e. an end of the main body 41 farthest from the motor case 20).

The controller case 40 is disposed in the following manner, in which the main body 41 and the cylinder part 21 of the motor case 20 are coaxially disposed and a surface of the lid 44 abuts to a surface of the bottom part 22 of the motor case 20. In other words, the controller case 40 (i.e., the main body 41) and the motor case 20 (i.e., the cylinder part 21) are arranged to have their axes aligned substantially in parallel with each other (i.e., the axis of the controller case 40 and the motor case 20 are aligned about the center axis X). At the center of the lid 44 of the controller case 40, a pipe part 441 is formed. An inner wall of the pipe part 441 is abuts to an outer wall of the pipe part 27 of the bottom part 22 of the motor case 20. Further, the lid 44 has, at positions corresponding to the first opening 25 and the first opening 26 of the bottom part 22 of the motor case 20, a cutout portion 442 and a cutout portion 443 formed thereon, respectively.

The controller 100 has a power unit 50 and a control unit 60. The circuit configuration of the controller 100 is shown in FIG. 3. The power unit 50 has a first capacitor 51, a choke coil 52, a power module 53 as an inverter circuit, a power module 54 as an inverter circuit, and second capacitors 55.

The power unit 50 receives electricity from a power source 6 via the power connector 421 of the first connector 42. The first capacitor 51 and the choke coil 52 form a filter circuit to reduce noise to the drive unit 10 from other devices that share the power source 6 with the drive unit 10 and to also reduce noise from the drive unit 10 to the other devices. Further, the choke coil 52 is connected in series (i) between the power source 6 and the power module 53 and (ii) between the power source 6 and the power module 54, for attenuating a fluctuation of power supply.

The power module 53 is a semiconductor module that is covered by a sealing material, such as resin, and may be referred to as a sealing body. The power module 53 further includes switching elements 501 to 506, power source relays 507, 508, and shunt resistors 509, together with other parts.

In the present embodiment, the switching elements 501 to 506 may be provided as a field effect transistor, such as a metal-oxide-semiconductor field-effect transistor (MOSFET). The switching elements 501 to 506 are controlled by a gate voltage, for turning on/off a source-drain conductivity.

The drains of each of the switching elements 501 to 503 are coupled to the power source 6. The source of the switching elements 501 to 503 are coupled to the drains of the switching elements 504 to 506, respectively. The sources of the switching elements 504 to 506 are coupled to a ground. The connection points between the switching elements 501 to 503 and the switching elements 504 to 506 are electrically coupled to the motor 30.

The power source relays 507, 508 are MOSFET just like the switching elements 501 to 506. The power source relays 507, 508 are disposed between the switching elements 501 to 506 and the choke coil 52 to prevent an electric current from flowing toward the motor 30 side through the switching elements 501 to 506 during an abnormality.

The shunt resistors 509 are electrically coupled to a point between the switching elements 504 to 506 and a ground. The electric current flowing to the motor 30 can be detected by detecting the electric voltage or the electric current applied to the shunt resistor 509.

The power module 54 has the same configuration as the above-mentioned power module 53. The description of the power module 54 is thus omitted.

The second capacitor 55 is coupled to wiring and the ground, such that the second capacitor 55 is coupled in parallel with the switching elements 501 to 506. The second capacitor 55 supplements power supply for the switching elements 501 to 506 by storing an electric charge, and absorbs a ripple electric current occurring by switching of the electric current.

The control unit 60 has a custom IC 61, a rotation angle sensor 62 and a control IC 63, together with other parts.

The custom IC 61 is an integrated semiconductor circuit including a regulator 64, a rotation angle sensor signal amplifier 65 and a detection voltage amplifier 66, together with other parts.

The regulator 64 is a stabilization circuit stabilizing electricity from the power source 6. The regulator 64 stabilizes electricity supplied for each part. For example, a microcomputer 67 to be described later is operated on a stable predetermined voltage of, for example, 5V from the regulator 64.

The rotation angle sensor 62 transmits a signal to the rotation angle sensor signal amplifier 65. The rotation angle sensor 62 is disposed close to an end of the shaft 33 of the motor 30 near the magnet 37 (FIGS. 1 and 2). The rotation angle sensor 62 transmits to the rotation angle sensor signal amplifier 65, the sensed magnetic field as a signal regarding a rotation angle of the motor 30. The rotation angle sensor signal amplifier 65 amplifies the signal regarding the rotation angle of the motor 30 transmitted from the rotation angle sensor 62, and transmits the amplified signal to the microcomputer 67.

The detection voltage amplifier 66 detects a voltage between both ends of the shunt resistors 509, and amplifies and transmits the detected voltage to the microcomputer 67.

The control IC 63 is an integrated semiconductor circuit including the microcomputer 67, a pre-driver 68, a pre-driver 69, and the like. The microcomputer 67 is a small scale computer including a CPU as an operation unit, a ROM and a RAM as a memory unit, together with other parts. In the microcomputer 67, various kinds of processes are performed by a CPU according to various programs stored in the ROM.

The microcomputer 67 receives various kinds of information, such as the rotation angle of the motor 30 from the rotation angle sensor signal amplifier 65, voltage of the shunt resistors 509 from the detection voltage amplifier 66, the steering torque signal from the torque sensor 5 via the second connector 43, vehicle speed information from CAN via the signal connector 422 of the first connector 42, and the like. When these signals provided, the microcomputer 67 controls the power module 53 through the pre-driver 68 based on the rotation angle of the motor 30. More practically, the microcomputer 67 changes the gate voltage of the switching elements 501 to 506 through the pre-driver 68, for turning on/off of the switching elements 501 to 506, to ultimately control the power module 53.

Based on the voltage of the shunt resistors 509, which is provided by the detection voltage amplifier 66, the microcomputer 67 controls the power module 53 to supply an electric current having a shape that is close to a sine wave to the motor 30. Further, the microcomputer 67 controls the power module 54 through the pre-driver 69 in the same manner as controlling the power module 53 through the pre-driver 68.

The microcomputer 67 generates a pulse signal created through the pre-driver 68 and the pre-driver 69 by pulse width modulation (PWM) control, for the purpose of assisting a steering operation of the steering wheel 4, based on vehicle speed information and the like from various sensors, such as the rotation angle sensor 62, the torque sensor 5, the shunt resistor 509, and CAN. The pulse signal is provided to two systems of inverter circuits that are formed by the power module 53 and the power module 54, and controls ON-OFF switching of the switching elements 501 to 506 in the power modules 53, 54. In such manner, each phase of the winding wires 34 of the motor 30 has a sine wave current of respectively different phases, thereby creating a rotating magnetic field. Accordingly, the rotating magnetic field rotates the rotor 32 and the shaft 33, as one body. Thus, as the shaft 33 is rotated, a driving force is provided from the output end 38 of the shaft 33 to the gear 3 on the column 2, for assisting a steering of the steering wheel 4 by the vehicle driver.

With continuing reference to FIGS. 1 and 2, the physical arrangement of each part of the controller 100 is described in the following. The controller 100 is housed inside of the controller case 40 (i.e., the main body 41). In other words, the controller 100 is housed in an accommodation space that is defined by the main body 41 of the controller case 40, the lid 44, and the cover 45. The controller 100 has a heat sink 70, a power board 76, a control board 77, a second terminal 701, and the like, in addition to the above-mentioned power unit 50 and the control unit 60.

The heat sink 70 may be formed, for example, by metal such as aluminum. The heat sink 70 has a first heat dissipation unit 71, a second heat dissipation unit 72, and a pillar 73. The first heat dissipation unit 71 and the second heat dissipation unit 72 are formed in a block shape, and are disposed with a predetermined distance interposed therebetween to face each other. The pillar 73 is formed substantially in a cylinder shape, and is disposed on an end of the first heat dissipation unit 71 and on both ends of the second heat dissipation unit 72, that is, three pillars 73 are disposed in total.

Figure 4A:
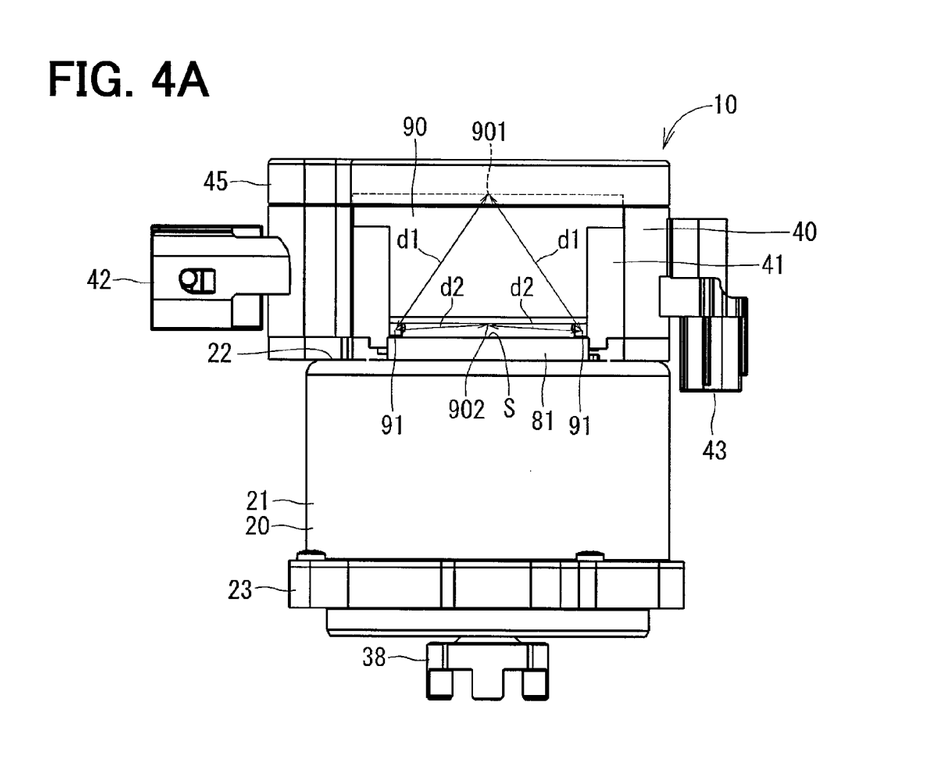
FIG. 4A is a front view of the drive unit of the present disclosure.
Figure 4B:
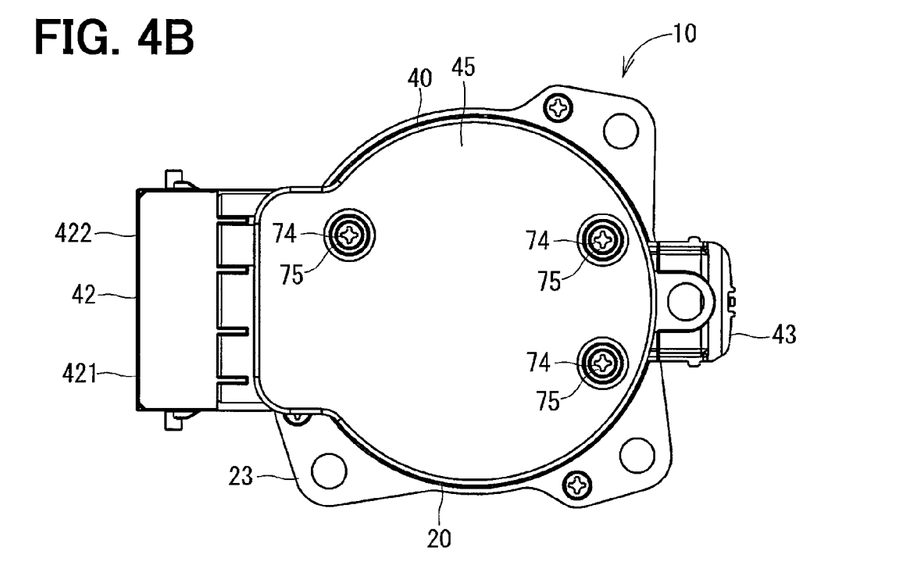
FIG. 4B is a top view of the drive unit of the present disclosure.
Figure 8A:
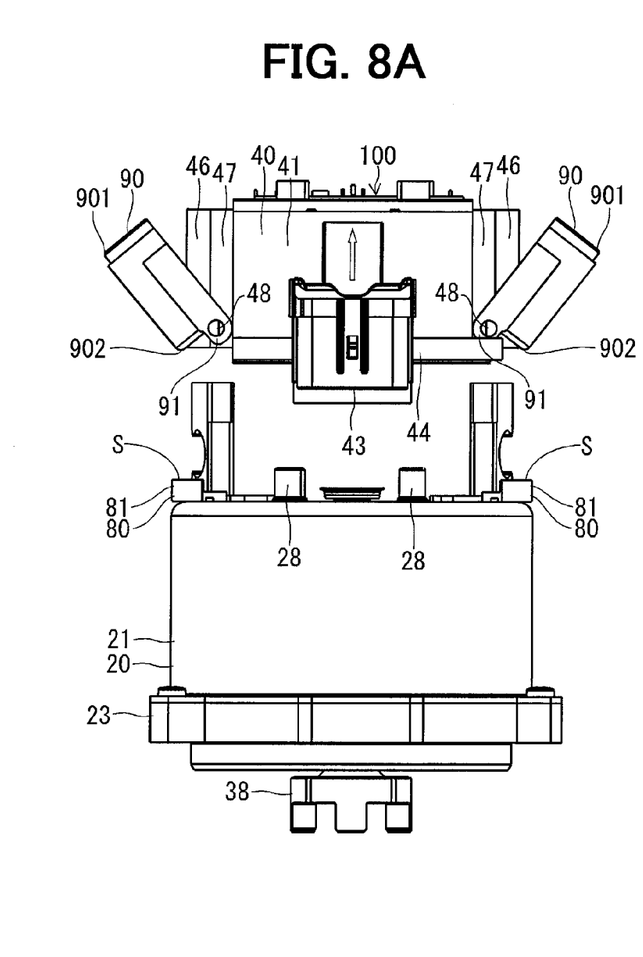
FIG. 8A is a side view of the controller case and the motor case in a detached state of the present disclosure.

Inside of the pillar 73 of the heat sink 70, bolts 74 are inserted (FIG. 4B). The bolt 74 has a screw on the other side of a head 75, and the screw of the bolt 74 is screwed into a column 28 (see FIG. 8) that is disposed on the bottom part 22 of the motor case 20. In such manner, the heat sink 70, in a housed condition in the controller case 40, is attached to the bottom part 22 of the motor case 20 together with the controller case 40.

The power board 76 is a board that may be, for example, a glass epoxy board, and is disposed between the cover 45 and the first and second heat dissipation unit 71, 72. The first capacitor 51, the choke coil 52, and the second capacitor 55 are provided on the power board 76, specifically on the surface of the power board 76 that faces the first and second heat dissipation unit 71, 72 and the motor 30. The first capacitor 51, the choke coil 52, and the second capacitor 55 are arranged side by side in a space formed between the first heat dissipation unit 71 and the second heat dissipation unit 72.

The control board 77 is a board that may be, for example, a glass epoxy board, and is disposed between the lid 44 and the first and second heat dissipation unit 71, 72. The custom IC 61 and the rotation angle sensor 62 are provided on a surface of the control board 77, specifically, the surface facing the motor 30. The rotation angle sensor 62 is disposed on an axis of the shaft 33. Further, the control IC 63 is provided on an opposite surface of the control board 77, specifically, the surface of the control board 77 that faces the cover 45.

The power module 53 is attached to a surface of the first heat dissipation unit 71, in an abutment manner, by way of a fastener, such as a screw. The power module 53 is attached to the surface of the first heat dissipation 71 that does not face the second capacitor 55. Further, the power module 54 is attached to a surface of the second heat dissipation unit 72, in an abutment manner, by way of a fastener, such as a screw. The power module 54 is attached to the surface of the second heat dissipation 72 that does not face the second capacitor 55 (FIG. 1).

The power module 53 has three power side terminals 510, which are coupled to respective connection points between the switching elements 501 to 503 and the switching elements 504 to 506, and protrude from the sealing body of the power module 53. The terminals on the opposite side of the sealing body, which is opposite to the power terminals 510, are soldered on the printed wires on the power board 76. Further, the power module 53 has control side terminals 511, which are coupled to the respective gates of the switching elements 501 to 506, and protrude from the sealing body. The terminals on the opposite side, which is opposite to the control side terminals 511, are soldered on the printed wires formed on the control board 77. In such manner, the power module 53 and the control IC 63 (i.e., the microcomputer 67) are electrically coupled through the printed wire.

The power module 54 has, just like the power module 53, the power side terminals 510, which are soldered on the printed wire on the power board 76, and also has the control side terminals 511, which are soldered on the printed wire on the control board 77, and are electrically coupled to the control IC 63.

The second terminal 701 is formed, for example, by metal such as copper, and is held by the main body 41 of the controller case 40. In the present embodiment, six second terminals 701 are arranged in total, corresponding to the three power side terminals 510 of the power module 53 and the three power side terminals 510 of the power module 54.

One end of each of the second terminals 701 is soldered on the printed wire on the power board 76, and is electrically coupled to the power side terminals 510 of the power modules 53, 54. In other words, one end of the second terminal 701 is electrically coupled to each of the switching elements 501 to 506.

The other end of each of the second terminals 701 is formed in a male shape and is fitted to the other end (i.e., in a female shape) of each of the first terminals 301 of the motor 30. In other words, the other end of each of the second terminals 701 and the other end of each of the first terminals 301 are engaged to enable an electrical connection with each other.

The terminal holder 80 may be formed by resin. As described above, the terminal holder 80 is disposed at two positions in the present embodiment, that is, it is attached to the first opening 25 and to the first opening 26, which are formed on the bottom part 22 of the motor case 20. Further, two terminal holders 80 respectively close the first opening 25 and the first opening 26. Each of the terminal holders 80 holds the first terminal 301 that is coupled to the end 39 of the winding wire 34 that goes through the first opening 25 or the first opening 26.

Figure 8B:
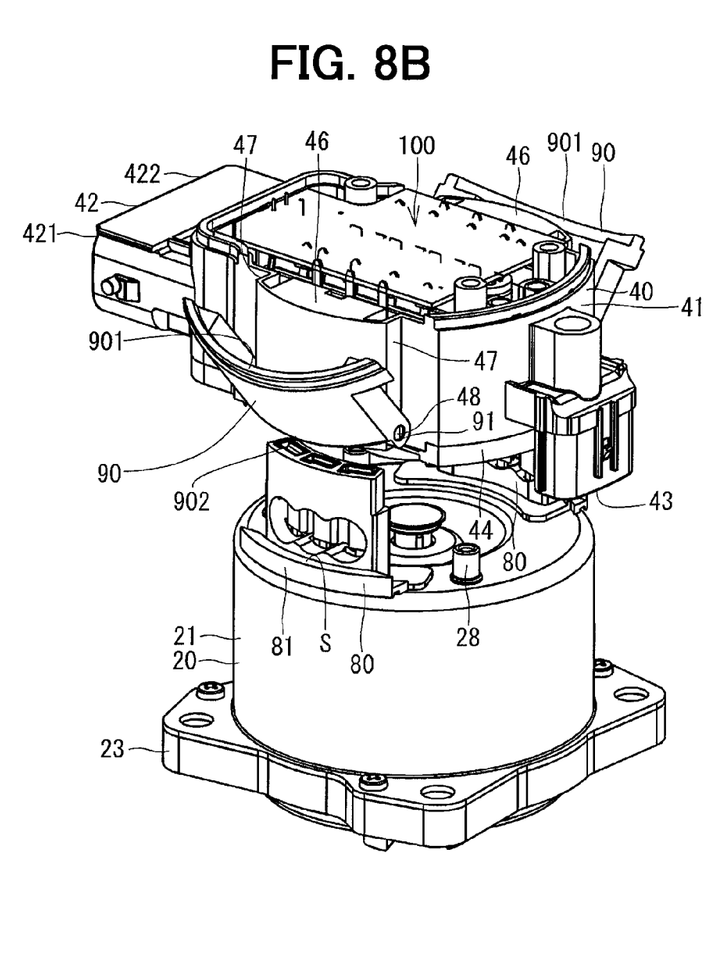
FIG. 8B is a perspective view of the controller case and the motor case in the detached state of FIG. 8A.

In the present embodiment, the terminal holder 80 is formed substantially in a rectangular shape, with an outer-surface and an inner-surface of the terminal holder protruding slightly outward to form a curved contour (i.e. outer-surface of the terminal holder 80 protruding as a curved surface with inner-surface being formed as a curved hollow surface) (see FIGS. 8A, 8B). The outer-surface of the terminal holder 80 faces away from the shaft 33 and the inner-surface of the terminal holder 80 faces the shaft 33 (i.e. the outer-surface facing radial outside of the motor case 20 and the other side facing radial inside of the motor case 20).

The terminal holder 80 has a ledge 81 formed on a lower portion of the terminal holder 80. The lower portion of the terminal holder 80 is close to the motor case 20 side of the drive unit 10. The ledge 81 extends from the lower portion of the terminal holder in a outwardly radial direction away from the shaft 33 (see FIGS. 1, 8A, 8B).

Further, the terminal holder 80 has an extension 82 that is formed on the lower portion of the terminal holder, and extends in an inwardly radial direction toward the shaft 33 (i.e. extends in a radial inward direction of the motor case 20 toward the inside of the motor case). The extension 82 is positioned on the other side of the bottom part 22 relative to the cylinder part 21 when the terminal holder 80 is disposed on the bottom part 22 of the motor case 20.

Further, the terminal holder 80 has an arc-shaped protrusion 83 on the lower portion (i.e., motor case 20 side area of the terminal holder 80). The arc-shaped protrusion 83 of both of the terminal holders 80 respectively engages the first opening 25, 26 in assemble condition of the driver unit (i.e. when the terminal holder 80 is disposed on the bottom part 22 of the motor case 20).

Further, the position of the terminal holder 80 is fixedly defined by the binding of the extension 82 in between the bottom part 22 and a cutout portion 442 or a cutout portion 443 of the lid 44 (see FIG. 1).

In the present embodiment, the terminal holder 80 holds the first terminal 301 in a disposed state on the bottom part 22 of the motor case 20. In such manner, the first terminal 301 is prevented from falling off (i.e., being pulled out) from the terminal holder 80 in a longitudinal direction of the holder 80, which is in parallel with the axis of the motor case 20 (i.e. parallel with the center axis X).

The terminal holder 80 holds the first terminal 301 in such manner so that the end of the first terminal 301 in a female shape and the end of the second terminal 701 in a male shape are engageable (i.e. engagement portion). Each of the terminal holders 80 holds three first terminals 301. Further, in the present embodiment, the structure of the engagement between the first terminal 301 and the second terminal 701 is formed in a shape that allows insertion and pullout of the first terminal 301 and the second terminal 701 in a direction that is in parallel with the axis of the motor case 20.

By devising the above-mentioned structure, the controller case 40 can be separated from the bottom part 22 of the motor case 20 with the controller 100 housed therein, simply by un-screwing the bolt 74 (see FIGS. 4A, 4B, 8A, 8B). In other words, the controller case 40 is detachably disposed on one side of the bottom part 22 of the motor case 20, which is an opposite side of the cylinder part 21 relative to the bottom part 22, with the controller 100 housed therein.

A lever 90 is installed on an outer wall of the main body 41 of the controller case 40. With reference to FIGS. 6A to 9B, details of the installation of the lever 90 is described in the following.

Figure 9A:
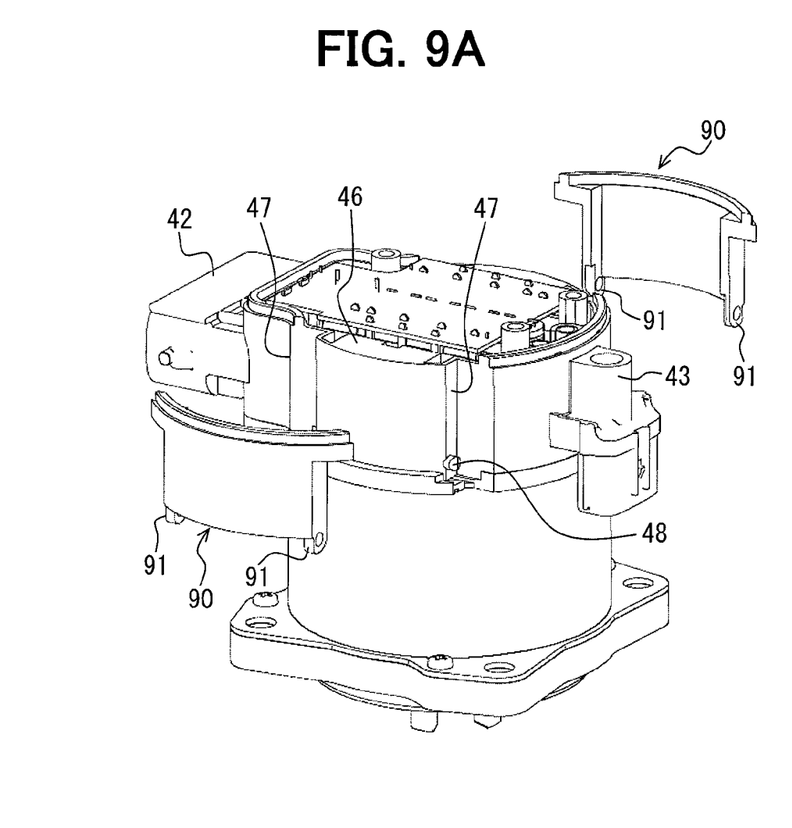
FIG. 9A is a disassembled view of the lever from the drive unit.
Figure 9B:
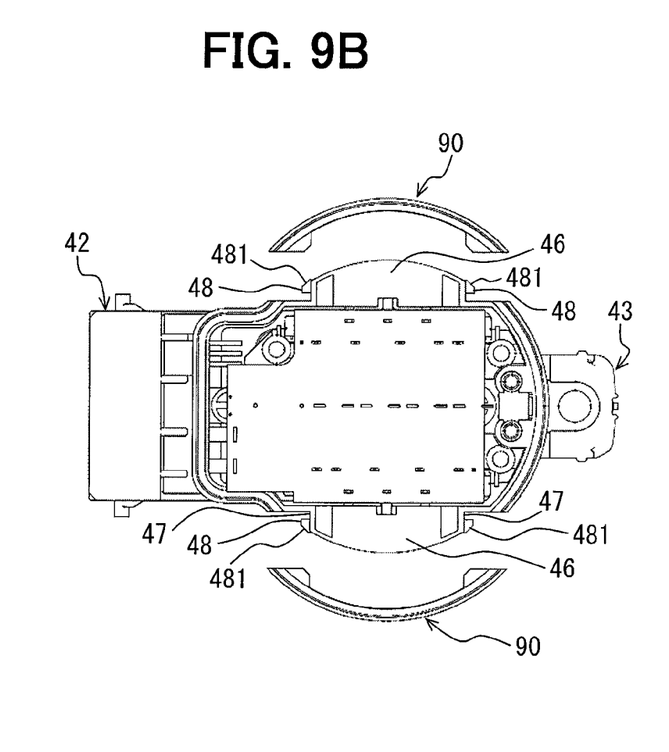
FIG. 9B is a top view of FIG. 9A.

An install area 46 is formed on an outer wall of the main body 41 of the controller case 40. In the present embodiment, the install area 46 is formed substantially at two positions of the outer wall of the main body 41, which are substantially linear-symmetric relative to the axis of the main body 41 (i.e. the center axis X) The install area 46 is formed at a position between the first connector 42 and the second connector 43. In other words, the outer wall is disposed symmetrically on either side of the main body between the first connector 42 and the second connector 43.

Figure 5A:
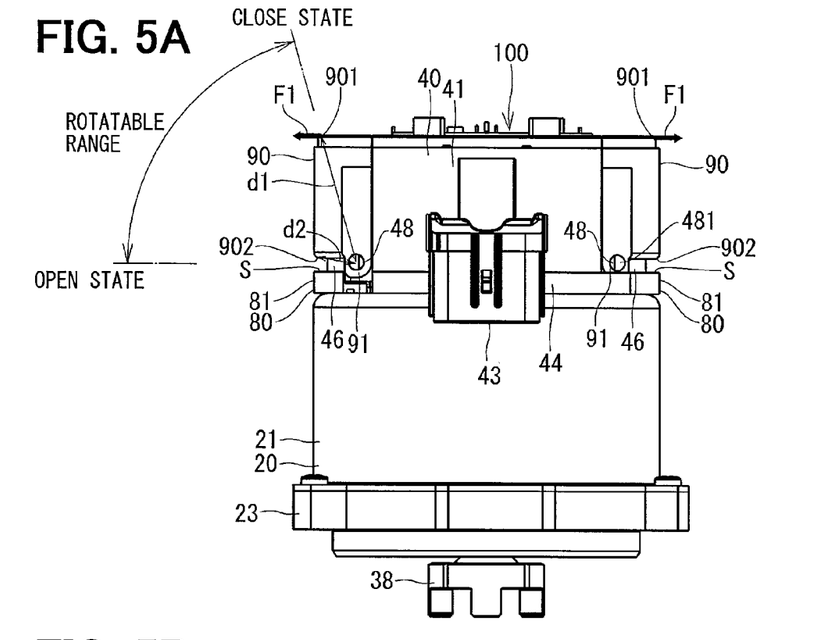
FIG. 5A is a side view of the drive unit in a lever close state of the present disclosure.

Each of the install areas 46 has two side surfaces 47 that are parallel with each other and with the axis of the main body 41. Further, the install area 46 has a supporting leg 48 that protrudes perpendicularly from each of the side surfaces 47 in a column shape. In other words, each of the install areas 46 has two supporting legs 48. Each of the supporting legs 48 has a tilt face 481 tilted against the axis of the leg 48, which is an opposite end of the column shape relative to a base portion (i.e., the side surface 47) of the column shape (FIG. 5A, 9A, 9B).

The supporting leg 48 on each of the install areas 46 are formed to protrude from the outer wall of the main body 41 at two positions on a virtual plane that is perpendicular to the axis of the main body 41. More practically, the supporting legs 48 extends along the virtual plane, with two axis of the two legs 48 coinciding with each other.

The lever 90 is installed at each of the install areas 46. In other words, the lever 90 of the present embodiment is arranged at two positions that are point-symmetric relative to a point on the axis of the main body 41 of the controller case 40.

The lever 90 may substantially be formed in a rectangular shape by, for example, resin, with an outer-surface and an inner-surface of the lever 90 protruding slightly outward to form a curved contour (i.e. outer-surface protruding as a curved surface and inner-surface being formed as a curved hollow surface). In other words, the lever 90 is formed as a cutout part from a cylinder. Therefore, in the assembled condition of the drive unit 10, the lever 90 fits into the install area 46, such that an outline of the outer-surface of the lever 90 substantially matches or aligns with an outline of an outer-surface of the cylinder part 21 of the motor case 20 (FIGS. 4A, 4B, 5A). Specifically, the outline of the outer-surface of the lever 90 is positioned within an external outline of the motor case 20 and the controller case 40 of the drive unit 10, when the drive unit 10 is viewed from top toward the cover 45 of the controller case 40 (FIG. 5B).

The lever 90 has a supported portion 91, a first action point 901 and a second action point 902. The supported portion 91 is formed to be supported by the supporting leg 48 in a rotatable manner, when fitted to the supporting leg 48 of the controller case 40 by way of a hole defined by the supported portion 91 (FIG. 9A, 9B). Therefore, each the levers 90 has two supported portions 91.

Figure 5B:
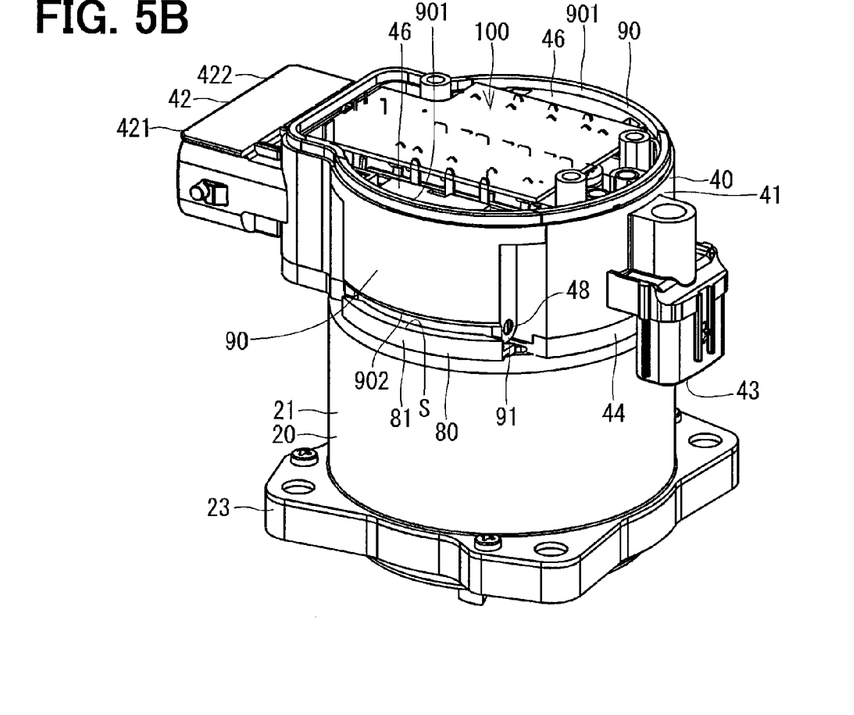
FIG. 5B is a perspective view of the drive unit in the lever close state of FIG. 5A.

The first action point 901 is formed at a position that is positioned away by a first distance d1 from a center of each of the supported portions 91 (FIG. 4B, 5B). In the present embodiment, when the lever 90 fits into a silhouette (i.e., outline) of the cylinder part 21 of the motor case 20 in a fitted state at the install area 46, the first action point 901 is positioned at a center of a top end of the lever 90, which is close to the cover 45 side of the lever 90 and opposite to a lower end of the lever 90, which is close to the bottom part 22 side of the lever 90. In other words, on the outer-surface of the lever 90 at a position equidistant from both of the supported portions 91 and farthest from the motor case 20, the first action point 901 is positioned at a center of an arc shape end of the outer-surface (FIG. 4A).

The second action point 902 is formed at a position that is positioned away by a second distance d2 from the center of each of the supported portions 91 (FIG. 4A, 5A). In the present embodiment, when the lever 90 fits into a silhouette (i.e., outline) of the cylinder part 21 of the motor case 20 in the fitted state at the install area 46, the second action point 902 is positioned at a center of the lower end of the lever 90, which is close to the bottom part 22 side of the lever 90 (i.e. close to the bottom part 22 of the motor case 20). In other words, on the outer-surface of the lever 90 at a position equidistant from both of the supported portions 91 (i.e. separated by the second distance d2) and at an end closest to the motor case 20, the second action point 902 is positioned at a center of an arc shape of the outer-surface of the lower end.

The lever 90 is rotatable about the supported portion 91 at the install area 46 as described above. The rotatable range of the lever 90 in FIG. 5A has two end states, one as a close state when the first action point 901 of the lever 90 stays closest to the install area 46, the other as an open state when the first action point 901 of the lever 90 stays farthest from the install area 46.

Figure 6A:
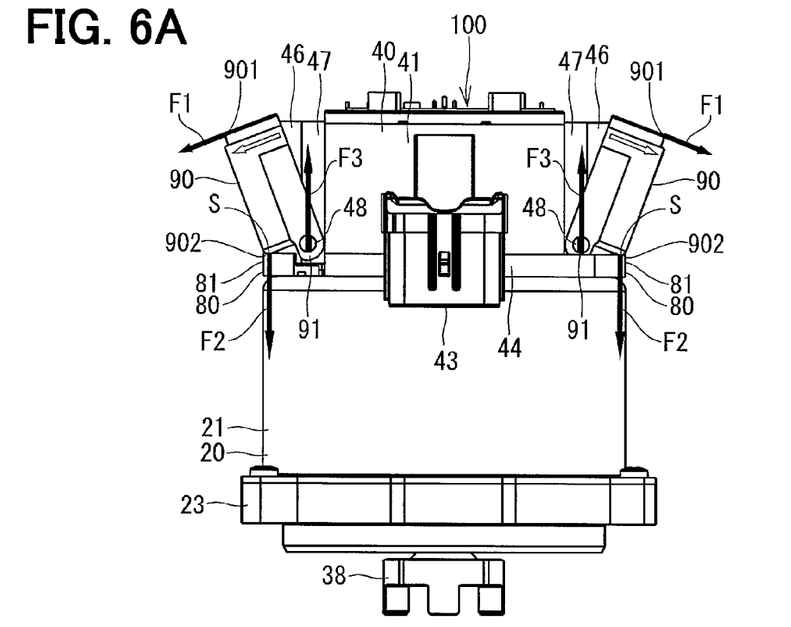
FIG. 6A is a side view of the drive unit in a lever abutting state of the present disclosure.
Figure 6B:
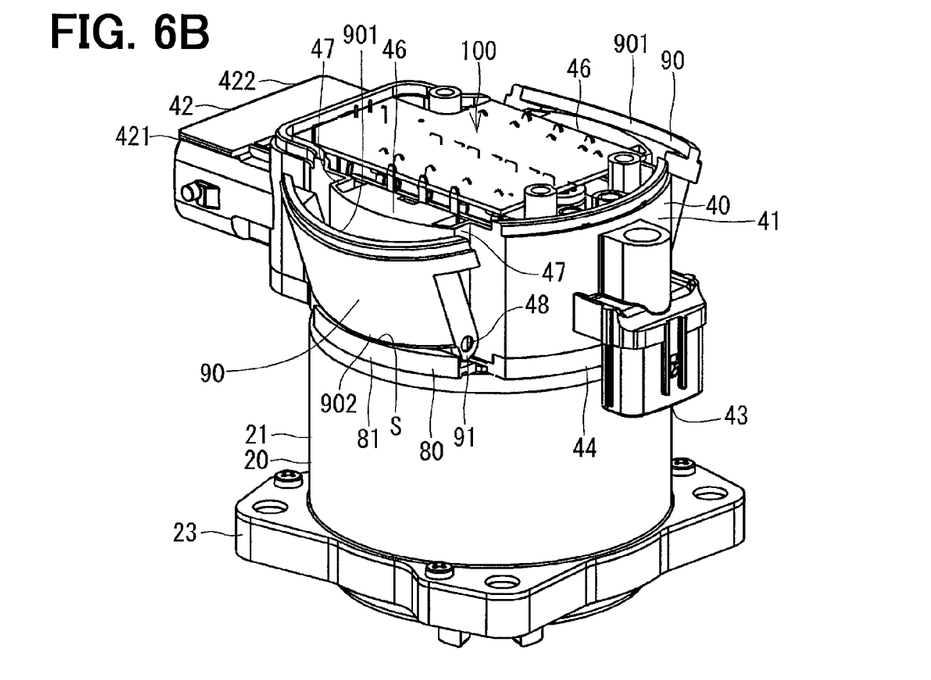
FIG. 6B is a perspective view of the drive unit in the lever abutting state of FIG. 6A.
Figure 7A:
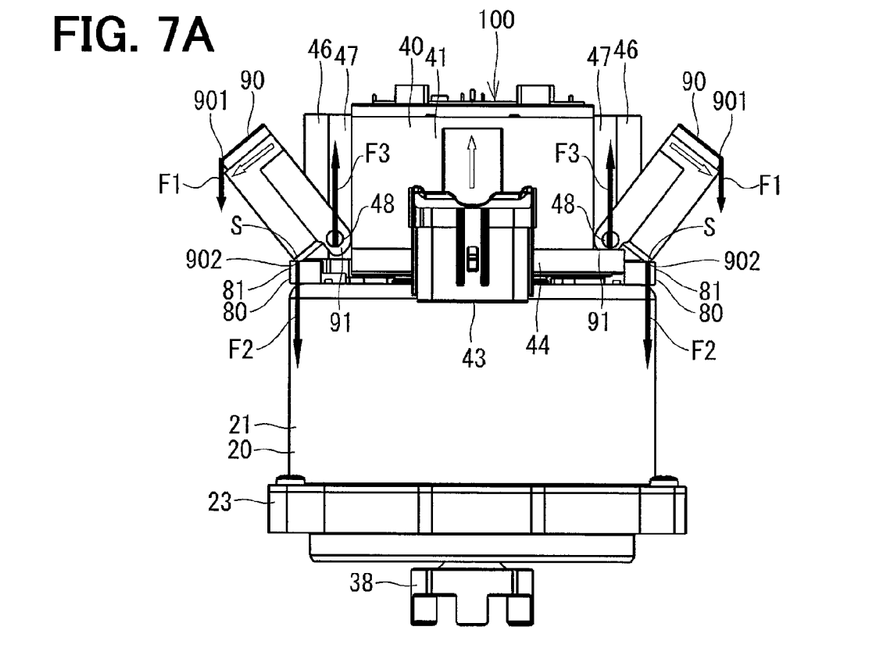
FIG. 7A is a side view of the drive unit with its lever lifting up the controller case of the present disclosure.
Figure 7B:
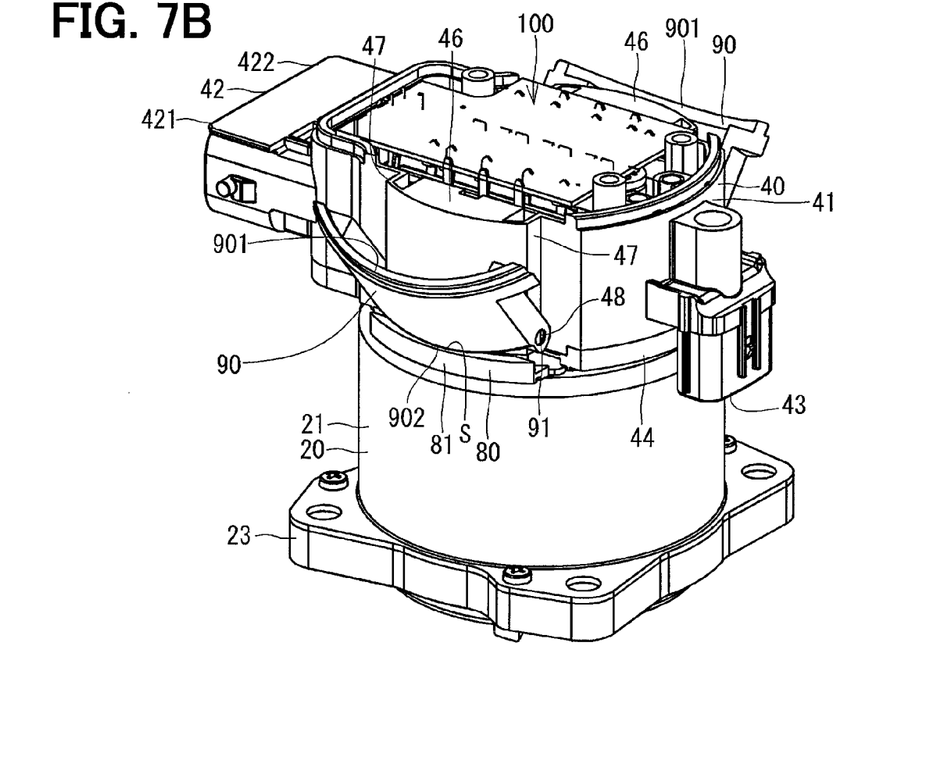
FIG. 7B is a perspective view of the drive unit with its lever lifting up the controller case of FIG. 7A.

In the present embodiment, the second action point 902 abuts on a specific part S of the ledge 81 of the terminal holder 80 of the motor case 20 when the lever 90 rotates from the close state toward the open state according to a first force F1 applied to the first action point 901 (FIG. 5A, 6A). At such moment, a second force F2 in a direction parallel with the axis of the motor case 20 acts from the second action point 902 to the specific part S, and, at the same time, a third force F3 in an opposite direction to the second force F2 and is in parallel with the axis of the motor case 20, acts from each of the supported portions 91 to the supporting legs 48 (FIG. 6A). The third force F3 is a total of two force acting on the two supporting legs 48, and such third force F3 is equal to the second force F2 in magnitude. Further, both of the second force F2 and the third force F3 are greater than the first force F1, because the first action point 901 and the second action point 902 satisfy a relationship of d1>d2.

Further, in the present embodiment, a predetermined gap is formed between the second action point 902 and the specific part S when the lever 90 is in the close state (FIG. 5A).

How the controller case 40 (i.e., the controller 100) is separated from the motor case 20 (i.e., the motor 30) of the drive unit 10 is described in the following.

(First Stage)

With reference to FIG. 6A, when, for example, the first force F1 in a radial outward direction of the motor case 20 is applied by a hand to the first action point 901 of the lever 90 in a state shown in FIG. 5, the lever 90 rotates about the supported portion 91 from the close state toward the open state. The rotation of the lever 90 continues until the second action point 902 of the lever 90 abuts on the specific part S of the terminal holder 80 according to the first force F1 on the first action point 901 (see FIG. 6A).

(Second Stage)

When the first force F1 in a direction in parallel with the axis of the motor case 20 is kept applied on the first action point 901 in a state of FIG. 6A, the second force F2 in a parallel direction in parallel with the axis of the motor case 20 acts on the specific part S from the second action point 902, and at the same time, the third force F3 in an opposite direction opposite to the second force F2 and in parallel with the axis of the motor case 20 acts on the supporting leg 48 from the supported portion 91. If the first force F1 is kept applied further on the first action point 901, the lever 90 rotates to lift up the controller case 40, thereby separating the controller case 40 and the motor case 20 away from each other along the axis of the motor case 20 (see FIG. 7). At such moment, a force that is in parallel with axis of the motor case 20 acts on the engagement portion between the first terminal 301 and the second terminal 701. If the first force F1 is kept applied further on the first action point 901 in such state, the engagement between the first terminal 301 and the second terminal 701 is completely released. Thereafter, if the controller case 40 and the controller 100 are moved away from the motor case 20, the motor case 20 (i.e., the motor 30) and the controller case 40 (i.e., the controller 100) are separated (see FIG. 8).

In summary, when the lever rotates from the close state toward the open state according to the application of the first force F1 in a lever-rotating direction on the first action point force F1, the second action point 902 abuts on the specific part S of the motor case 20 and the second force F2 in the direction that is in parallel with the axis of the motor case 20 acts on the specific part S of the motor case 20 from the second action point 902, and the third force F3 in the direction, being opposite to the direction of the second force F2 and in parallel with the axis of the motor case 20, acts on the supporting leg 48 from the supported portion 91 of the lever 90, in the present embodiment.

In such structure, when the first action point 901 of the lever 90 is manually rotated by the first force F1 having a certain magnitude, a separating force for separating the motor case 20 and the controller case 40 is applied to respective cases as the second force F2 and as the third force F3, and both of those forces are aligned in a direction that is in parallel with the axis of the motor 20. Therefore, the controller case 40 and the motor case 20 are easily moved (i.e., separated) in separate (i.e., opposite) directions along the axis of the motor case 20. In a course of such separation, an engagement portion that engages the first terminal 301 and the second terminal 701 receives a force that is in parallel with the axis of the motor case 20. Since, in the present embodiment, the insertion direction of the engagement portion of the first terminal 301 into the second terminal 701 (i.e., the insertion direction may also be a release direction for releasing such engagement) is aligned substantially in parallel with the axis of the motor case 20, the engagement between the first terminal 301 and the second terminal 701 is smoothly released when the controller case 40 and the motor case 20 are separated by using the lever 90 in the above described manner. Thus, the controller case 40 and the motor case 20 are smoothly separated by rotating the lever 90.

Further, in the present embodiment, the motor case 20 and the controller case 40 are separable/detachable from each other. Further, the electric connection between the first terminal 301 on the motor 30 side and the second terminal 701 on the controller 100 side is enabled by the engagement of those terminals with each other. Therefore, it is easy for those terminals to be connected or to be separated by an application of a certain force in a direction that connects or separates those terminals. Thus, the motor case 20 that houses the motor 30 and the controller case 40 that houses the controller 100 are easily connected or separated.

Further, in the present embodiment, the first distance d1 (i.e., a distance between the supported portion 91 and the first action point 901) of the lever 90 is greater than the second distance d2 (i.e., a distance between the supported portion 91 and the second action point 902) of the lever 90. Therefore, in such structure, the lever 90 exerts (i) the second force F2 from the second action point 902 to the specific part S of the motor case 20 and (ii) the third force F3 from the supported portion 91 of the lever 90 to the supporting leg 48 of the controller case 40, both of which are greater than the first force F1 that is applied to the first action point 901 of the lever 90. Such effect is well-known as a principle of leverage. Therefore, the structure in the present embodiment allows the user to apply a smaller force for separating the controller case 40 from the motor case 20, in comparison to a structure that has the first distance d1 being equal to or smaller than the second distance d2.

Further, in the present embodiment, when the lever 90 is in the close state, there is a gap between the second action point 902 and the specific part S of the motor case 20. Therefore, in a course of rotating the lever 90 by applying a force to the first action point 901, such structure allows a small force, which is directed in a radially-outward direction of the motor case 20, to rotate the lever 90 from the close state to a state in which the second action point 902 is abutted to the specific part S of the motor case 20. Further, after the abutment of the second action point 902 with the specific part S of the motor case 20, the controller case 40 and the motor case 20 are separated by a rotation of the lever 90 by a force that is applied in a parallel direction in parallel with the axis of the motor case 20. Therefore, the controller case 40 and the motor case 20 are easily separated from each other.

Further, in the present embodiment, the motor case 20 has a terminal holder 80 that holds the first terminal 301 for allowing the other end of the first terminal 301 to be engaged with the other end of the second terminal 701. Further, the specific part S is formed on the terminal holder 80 in the present embodiment. In such structure, when the controller case 40 is separated from the motor case 20 by rotating the lever 90, the second force F2 is applied from the second action point 902 of the lever 90 to the specific part S of the holder 80 in a direction that is in parallel with the axis of the motor case 20. In such manner, when the controller case 40 and the motor case 20 are separated from each other, a pull of the first terminal 301 toward the controller case 40 side with its smoothly-releasable engagement with the second terminal 701 is prevented. Therefore, when the controller case 40 and the motor case 20 are separated, the deterioration of the connection between the winding wire 34 of the motor 30 and the first terminal 301 is prevented.

Further, in the present embodiment, the supporting leg 48 of the controller case 40 is formed substantially in a pillar shape, and the top of the pillar shape (i.e., an opposite side of a base of the pillar shape) is made as a tilted face. In such structure, the supported portion 91 of the lever 90 is easily attached to the supporting leg 48 in a sliding manner over the tilted face.

Therefore, for example, the drive unit 10 may be shipped without the lever 90, and the lever 90 may be attached to the controller case 40 only in case of necessity for separating the controller case 40 from the motor case 20, that is, only in case of finding a malfunction of the controller 100 or the like.

Further, in the present embodiment, two levers 90 are arranged point-symmetrically against a point on the axis of the main body 41 of the controller case 40. In such structure, at least two points on the controller case 40, which are positioned on both sides of the axis of the case 40, receive a force that is in parallel with the axis of the motor case 20 (i.e., the second force and the third force) according to a simultaneous rotation of the two levers 90. Therefore, a smooth separation of the controller case 40 from the motor case 20 along the axis of the motor case 20 is achieved by applying only a small force.

(Other Embodiments)

Although the present invention has been fully described in connection with the preferred embodiment thereof with reference to the accompanying drawings, it is to be noted that various changes and modifications will become apparent to those skilled in the art.

In the above-described embodiment, the lever is formed to have such dimension that the first distance (i.e., a distance between the supported portion and the first action point) is greater than the second distance (i.e., a distance between the supported portion and the second action point). In contrast, the lever may have a different dimension that the first distance d1 is equal to or smaller than the first distance d1.

Further, a gap need not be formed between the second action point and the specific part of the motor case when the lever is in the close state in other embodiments of the present disclosure. In other words, the second action point may abut on the specific part of the motor case when the lever is in the close state.

Further, the motor case needs not have a terminal holder. In other words, the specific part on which the second action point abuts may be formed on the bottom part or on the cylinder part of the motor case.

Further, the supporting leg of the controller case needs not have a tilted face tilted against the axis of the leg on an end that is opposite to the base of the leg.

Further, the lever may be disposed at two asymmetric positions relative to a point on the axis of the controller case. Further, more than three levers may be disposed, or only one lever may be disposed.

Further, the lever has two supported portions and the controller case has the same number of supporting legs. In contrast, the lever may have only one supported portion to be attached on the controller case in a rotatable manner in other embodiments of the present disclosure.

Further, the drive unit may be used to drive other devices, such as a driving wheel of a hybrid vehicle, a device other than an automotive vehicle.

Such changes and modifications are to be understood as being within the scope of the present invention as defined by the appended claims.

What is claimed is:

1. A drive unit comprising:

a motor including a stator having a winding wire wound thereon, a rotor disposed inside of the stator, a shaft disposed inside of and coupled to the rotor serving as a rotation axis of the rotor, and a first terminal electrically coupled to an end of the winding wire, wherein the rotor and the shaft rotate relative to the stator as one;

a motor case substantially having a cylindrical shape to house the motor;

a controller including a switching element for switching supply of an electric current to the winding wire of the motor, a control unit for controlling a rotation of the motor via the switching element, and a second terminal that electrically couples to the switching element at one end and electrically couples to the first terminal at the other end;

a controller case housing the controller and having a support projecting outward from an outer-surface of the controller case in a direction perpendicular to an axis of the controller case, the controller case being attachable to one end of the motor case with the axis of the controller case substantially aligned in parallel with an axis of the motor case; and a lever including a supported portion coupled to the support of the controller case, a first action point positioned at a first distance from the supported portion, and a second action point positioned at a second distance from the supported portion, the supported portion being rotatable about the support and the lever being rotatable about the supported portion, wherein the lever is in a close state when the first action point is closest to the controller case, and is in an open state when the first action point is farthest from the controller case, and when the lever is rotated from the close state to the open state by an application of a first force to the first action point, the second action point is abutted to a specific part of the motor case providing a second force that is applied from the second action point to the specific part in a direction that is in parallel with the axis of the motor case, and providing a third force that is applied from the supported portion to the support as an opposite force that is opposite to the direction of the second force along the axis of the motor case.

2. The drive unit of claim 1, wherein the first distance of the lever is greater than the second distance of the lever.

3. The drive unit of claim 1, wherein when the lever is in the close state, a gap is defined between the second action point and the specific part of the motor case.

4. The drive unit of claim 1, wherein the motor case has a terminal holder that holds the first terminal to engage the first terminal with the second terminal, and the specific part is formed on the terminal holder.

5. The drive unit of claim 1, wherein
the support is substantially formed in a pillar shape, and
a top of the pillar shape has a tilted face.

6. The drive unit of claim 1, wherein two levers are arranged point-symmetrically against a point on the axis of the controller case.

\* \* \* \* \*